United States Patent
Curreri

(10) Patent No.: US 6,990,679 B2
(45) Date of Patent: Jan. 24, 2006

(54) PROGRAM SURF GRID

(75) Inventor: Matthew R. Curreri, Medford, NJ (US)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 602 days.

(21) Appl. No.: 09/740,382

(22) Filed: Dec. 19, 2000

(65) Prior Publication Data

US 2001/0054183 A1    Dec. 20, 2001

Related U.S. Application Data

(63) Continuation-in-part of application No. 09/541,120, filed on Mar. 31, 2000.

(51) Int. Cl.
G06F 3/00      (2006.01)
G06F 13/00     (2006.01)
H04N 5/445     (2006.01)

(52) U.S. Cl. .................................................. 725/56
(58) Field of Classification Search ............ 725/44–47, 725/52, 56, 27, 43, 40
See application file for complete search history.

(56) References Cited

U.S. PATENT DOCUMENTS

| | | | |
|---|---|---|---|
| 5,517,254 A | 5/1996 | Monta et al. | |
| 5,528,304 A * | 6/1996 | Cherrick et al. | 725/41 |
| 5,532,754 A | 7/1996 | Young et al. | |
| 5,559,548 A | 9/1996 | Davis et al. | |
| 5,652,628 A * | 7/1997 | Toyoshima et al. | 725/56 |
| 5,654,748 A * | 8/1997 | Matthews, III | 725/14 |
| 5,812,929 A * | 9/1998 | Tsutsui et al. | 725/56 |
| 5,815,145 A * | 9/1998 | Matthews, III | 725/41 |
| 5,883,677 A | 3/1999 | Hofmann | |

(Continued)

FOREIGN PATENT DOCUMENTS

WO     WO 9856176 A1 * 12/1998

(Continued)

Primary Examiner—Christopher Grant
Assistant Examiner—Scott Beliveau
(74) Attorney, Agent, or Firm—RatnerPrestia

(57) ABSTRACT

A viewer-defined group of channels allows a viewer to quickly navigate through the channels in the group. A channel matrix is used to display channels having program types or transmission characteristics that are selected by a user in a manner that allows the viewer to quickly select one of these channels. The channel matrix includes rows and columns of channel numbers, each corresponding to one channel in a group of channels. Channels having any of the selected program types or features are highlighted in the matrix. The viewer selects a program type or transmission characteristic using a menu. The program types may be predefined or defined by the viewer according to a set of parameters.

18 Claims, 9 Drawing Sheets

U.S. PATENT DOCUMENTS

| | | | |
|---|---|---|---|
| 5,907,322 A | | 5/1999 | Kelly et al. |
| 5,907,323 A | * | 5/1999 | Lawler et al. ................. 725/41 |
| 5,969,748 A | * | 10/1999 | Casement et al. ............ 725/27 |
| 6,003,041 A | * | 12/1999 | Wugofski ................ 707/104.1 |
| 6,005,565 A | * | 12/1999 | Legall et al. ............... 345/721 |
| 6,005,601 A | | 12/1999 | Ohkura et al. |
| 6,020,930 A | * | 2/2000 | Legrand ....................... 725/41 |
| 6,057,831 A | * | 5/2000 | Harms et al. ................. 725/38 |
| 6,133,909 A | * | 10/2000 | Schein et al. .............. 345/721 |
| 6,163,345 A | * | 12/2000 | Noguchi et al. ............ 348/564 |
| 6,600,522 B1 | * | 7/2003 | Kim ........................... 348/732 |
| 6,654,721 B2 | * | 11/2003 | Handelman ................. 704/270 |
| 6,766,526 B1 | | 7/2004 | Ellis |
| 6,817,027 B1 | * | 11/2004 | Curreri ........................ 725/28 |
| 2003/0014753 A1 | | 1/2003 | Beach et al. |

FOREIGN PATENT DOCUMENTS

| | | |
|---|---|---|
| WO | WO 200005886 A1 * | 2/2000 |
| WO | WO 200005887 A1 * | 2/2000 |

* cited by examiner

PROGRAM SURF GRID

RELATED APPLICATION

This application is a continuation in part of application Ser. No. 09/541,120, filed Mar. 31, 2000, and claims priority thereof.

FIELD OF THE INVENTION

The invention relates generally to program menus and more specifically to selective display grids that allow viewers to quickly navigate a large number of channels.

BACKGROUND OF THE INVENTION

The number of television programs that a viewer may receive at any given time has increased geometrically in the last few years. Conventional analog television systems such as those conforming to the National Television Standards Committee (NTSC) and Phase Alternate Line (PAL) standards transmit one program per six MHz or eight MHz channel. Recently, digital television signal processing techniques have been developed that allow multiple programs to be transmitted in each six MHz channel. Furthermore, there are now many sources of television signals in addition to the conventional broadcast antenna. A viewer may receive television signals via wired cable systems, several different types of satellite systems, so-called wireless cable systems and, in the near future, via a global information network, such as the Internet.

Conventional cable television systems are capable of delivering at least 140, six MHz channels and some systems are capable of delivering over 200 channels via a coaxial cable. Presently, new technology is being investigated to increase the number of programs that can be delivered to the home. This is being done via two technologically strategic moves. The first is to increase the allocated bandwidth to one GHz (which provides for 150, six MHz channels). The second is to use video compression to configure a channel to carry up to ten minor channels in one six MHz channel. Channels that include a plurality of minor channels are also known as multiprogram channels. Typical numbers that are used in the industry estimate that about 500 programs can be delivered to the home over a single coaxial cable. Fiber optic cable provides many times the bandwidth of a coaxial cable and promises to be able to provide several thousand programs. In the same way, increased bandwidth for satellite systems may allow a viewer to receive upwards of one-thousand six MHz channels, each channel containing up to ten minor channels.

It is difficult, however, for a viewer to sort through this large number of programs. Problems are already being felt where subscribers searching through 140 programs, much less 500 or 1000. To address this problem, many of the newer television systems have on-screen menus that present the program selections organized by type. One such system uses a dedicated channel to display program schedule information. To view the information, the viewer simply tunes to the dedicated channel. The advantage of such a system is that it is relatively easy to deploy because it is centrally implemented at the transmission head-end. No additional electronics or software is required at the viewer location because full control of the display is maintained at the transmission head-end. The display information is then broadcast continuously on a dedicated channel. The television viewer simply tunes the cable converter box or television tuner to the channel on which the schedule information is displayed to view the program listings. Typically, these program guides utilize a scrolling display of television listings. Some systems employ a partial screen of listings with additional information in the remainder of the screen such as advertisements for movies on pay channels, pay-per-view event schedules, time and weather information, and other commercial information. These systems generally incorporate a grid or matrix to display the program schedule information, with a different row for each channel and columns representing different time slots.

Another type of electronic program guide uses software and/or hardware in the viewer's receiver to retrieve and process a television schedule database that is transmitted during a portion of a television channel (e.g. the vertical blanking interval). One such system is the Starsight™ service. A television receiver equipped to use the Starsight service periodically tunes to a guide channel, even when the receiver is turned off, to recover a schedule information database that is encoded in the vertical blanking interval of the television signal that is sent over the guide channel. The system then formats the data so that it may be displayed to the viewer as a hierarchical set of on-screen menus. These menus allow the user some flexibility in determining how the data is displayed. For example, program data may be displayed by type of program (e.g. sports, drama, comedy). Alternatively the viewer may select only a few favorite channels for which data are displayed.

Even with this amount of interaction, existing electronic program guide (EPG) systems may be frustrating for a viewer, especially one who has access to a large number of channels, because only a relatively small number (e.g. ten) can be viewed at any one time. If, for example, a viewer is connected to a fiber optic cable system or to a combination of a broadcast antenna, satellite dish and cable system and can receive 500 to 1000 programs, 50 to 100 screens would be needed to display all of the possible options. In addition, existing EPG systems are still somewhat difficult to use and lack features that may make them aesthetically pleasing. These deficiencies contribute to their limited use by viewers and general preference for printed television schedules.

In addition, many viewers may find a continuously scrolling program guide difficult to read because their eyes must follow the listings as they move up the screen. Compounding this problem is the tendency to use scrolling listings in a split screen format together with advertisements, promotional information and other information. It may be frustrating for viewers to be forced to continuously view this information while they are waiting for the schedule information for a desired channel to appear on the display.

Another possible reason why electronic program guides are under-utilized is they simply are boring to watch. While a full screen of listings allows for the display of more schedule information at one time and thus a shorter cycle time through the entire program schedule, viewers could be bored by the monotony of continuously viewing a full screen of listings. As indicated above, however, split screen program guides that simultaneously display additional information of possible interest to the viewer have the disadvantage of much longer cycle times.

A further possible reason why electronic program guides are under utilized is that viewers simply are not interested in many of the available programs. Many viewers limit their primary viewing to selected categories or programs.

Effective menu systems, however, are a requirement in the age of digital television. Due, in part, to the compression techniques used to encode up to ten standard definition television (SDTV) programs into one six MHz channel, switching among channels takes much more time on a digital receiver than on an analog receiver. It may take, for example, three or four seconds between the time the viewer selects a new program and the time any image information for that program is displayed on the receiver.

Accordingly, there exists a need for an improved technique of displaying program information in order to make program schedule grids more readable and manageable. There also exists a need for providing a more aesthetically pleasing display environment for the program schedule information, and more flexible display formats. There is also a particular need for a display system that can efficiently provide the above for a system comprising several hundred to several thousand channels.

SUMMARY OF THE INVENTION

The present invention is embodied in a display interface comprising a definable channel matrix having n rows and m columns, a channel matrix status portion, and a selected channel status portion. The channel matrix simultaneously displays selectors for up to n×m channels. The channel matrix status portion displays channel matrix information and allows the viewer to select a channel from the matrix via channel indicators. The selected channel status portion displays selected channel information and highlights channels having viewer selected features to help the viewer rapidly sequence through channels having those features.

According to one aspect of the invention, the features include selected program types and a characteristic of the channel indicators change to indicate selected program types.

According to another aspect of the invention, the viewer selects one or more of the program types from a menu and the channel indicators in the channel matrix for all programs having all of the selected types are displayed with the changed characteristic.

According to yet another aspect of the invention, the viewer selects at one or more one transmission parameters from the menu and the channel indicators in the channel matrix for all programs having the selected transmission parameters are displayed with the changed characteristic.

According to yet another aspect of the invention, the system includes means allowing the viewer to define the program types which may be selected.

Alternate embodiments of the invention include color-coding, other visual cues, and audio cues as the characteristics of the channel indicators.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Figure 1:
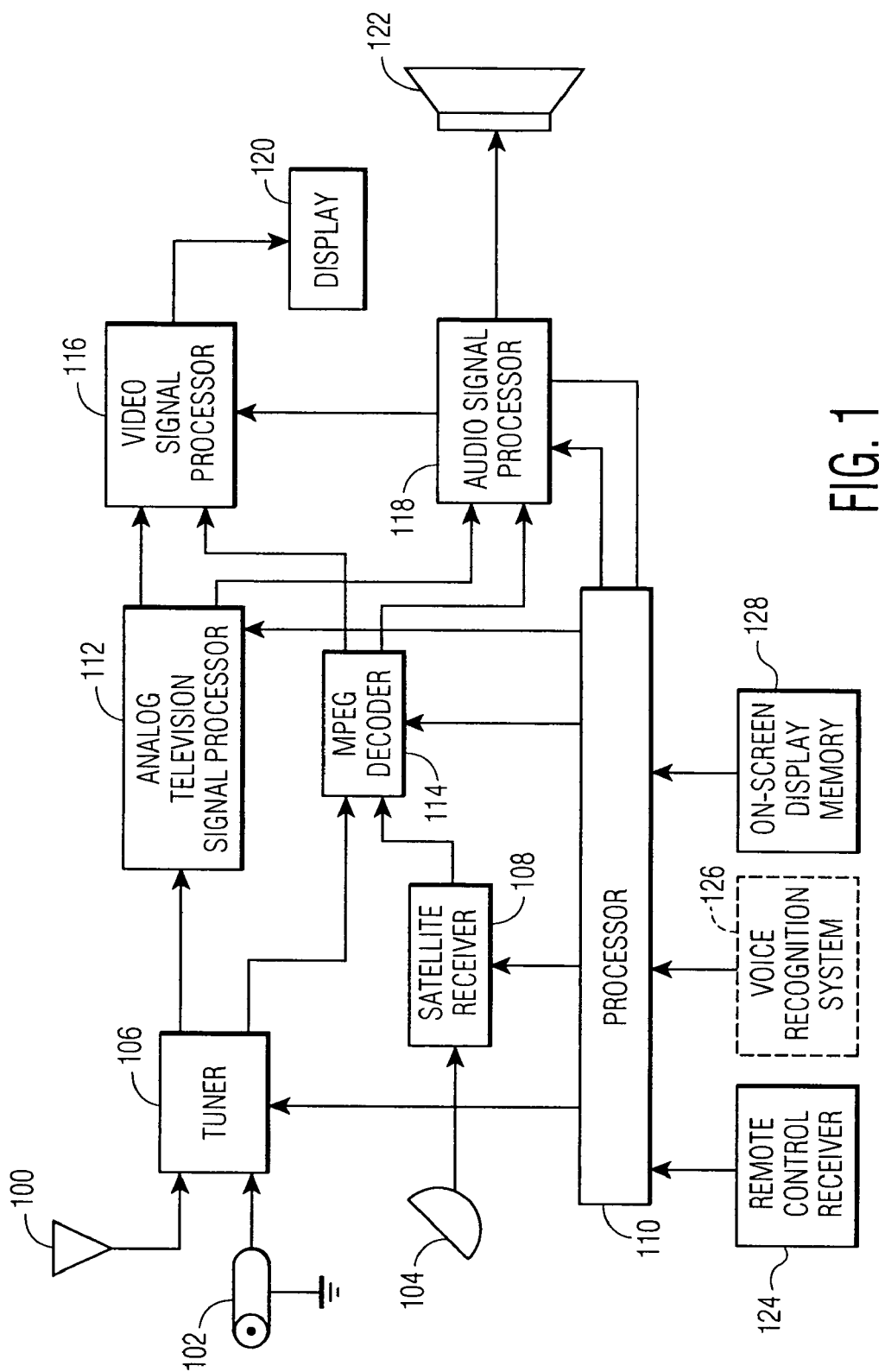
FIG. 1 is a block diagram of an exemplary television system in which the present invention may be implemented.

FIG. 1 is a block diagram of a television receiver system that includes an exemplary embodiment of the invention. The television receiver includes a tuner 106 that is coupled to receive radio frequency input signals from an antenna 100 and/or a cable connection 102. The system also includes a satellite receiver 108 that receives television signals via a satellite dish 104 that are encoded according to the standard specified by the Moving Picture Experts Group (MPEG). Both the tuner 106 and the satellite receiver 108 are controlled by a processor 110. The exemplary tuner 106 may receive analog television signals or signals encoded according to the standard specified by the Advanced Television Systems Committee (ATSC). This standard is a subset of the MPEG standard. The tuner provides analog television signals to an analog television signal processor 112 and provides ATSC encoded television signals to an MPEG decoder 114. Other MPEG encoded signals provided, for example, by the satellite receiver 108 are also provided to the MPEG decoder 114. Both the analog television signal processor 112 and the MPEG decoder 114 provide analog video and audio output signals. The video output signals are applied to a video signal processor 116 while the audio signals are applied to an audio signal processor 118. The video signal processor 116 generates video images for display on a display device 120 while the audio signal processor 118 generates accompanying sounds through a speaker system 122.

The processor 110 receives remote control commands via a remote control receiver 124. This receiver may be a conventional infra-red or ultrasonic remote control receiver. The processor may also be coupled to an optional voice recognition system 126 (shown in phantom) that may be used to receive voice commands from a viewer, as described below. Finally, the exemplary television system includes an on-screen display memory 128 in which the processor 110 may build the menus and channel matrixes described below. The processor 110 is coupled to the video signal processor 116 to display these menus either on a blank screen or as an overlay on the video images that are currently being displayed.

Figure 2:
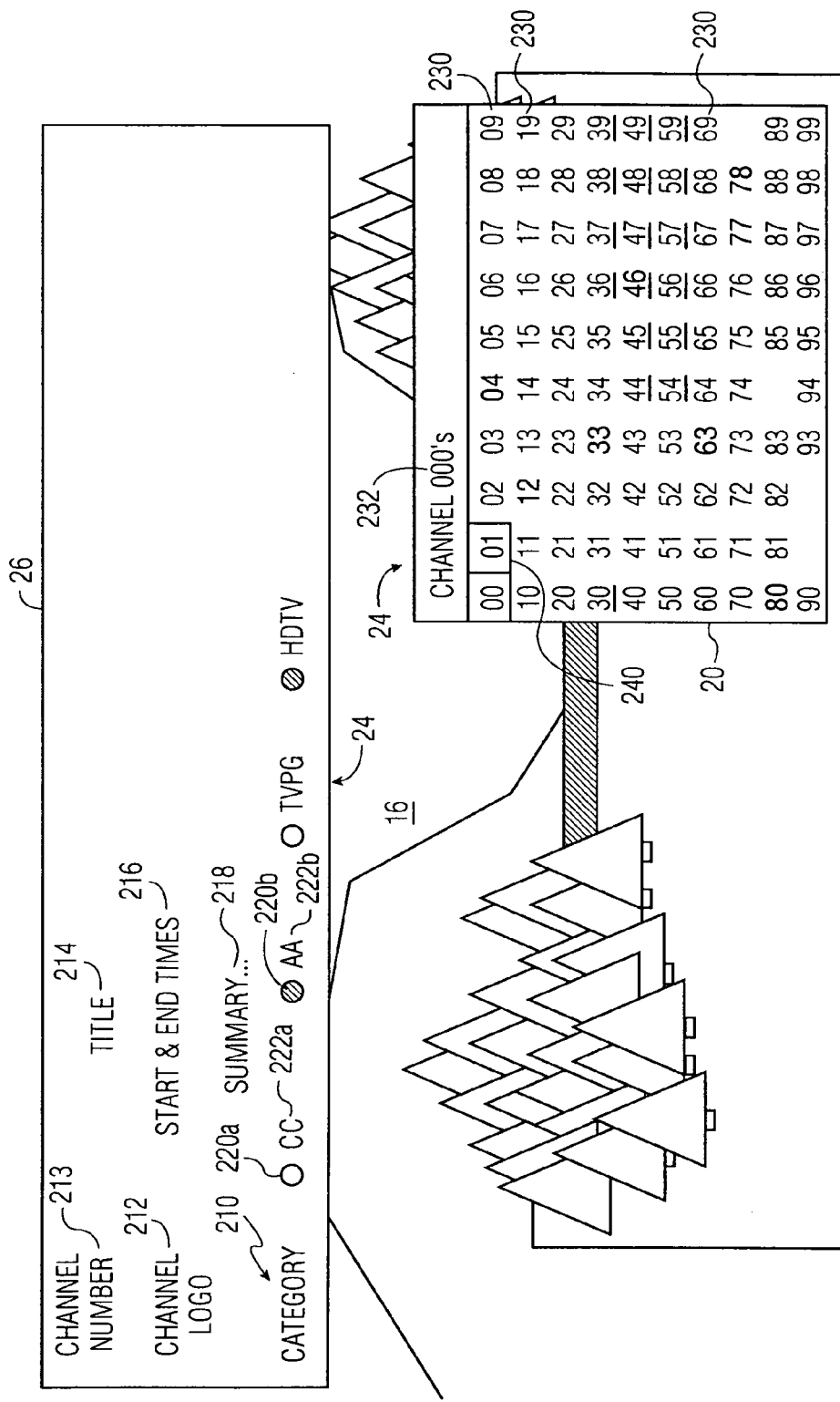
FIG. 2 is graphic depiction of a channel matrix display format having general application.

As previously stated, the large number of channels available to a viewer requires alternate methods for displaying channel data. A method according to the present invention overcomes this problem by using a channel matrix. FIG. 2 is a graphical depiction of an exemplary embodiment of a channel matrix 20 with a video image background 16. The matrix includes channel indicators for n times m channels. The exemplary channel matrix may be used with a number of different functions in the television receiver. The image shown in FIG. 2 may be displayed, for example, when the viewer selects such a function from a higher level menu (not shown). The exemplary screen shown in FIG. 2 allows a viewer to 1) determine which channels are broadcasting a particular type of program and 2) to tune to those channels on a channel-by-channel basis or to any other active channel.

The channel matrix 20 shown in FIG. 2 is a part of a channel surfing display 24. The display 24 also includes a selected channel status portion 26, including a channel category name 210, a channel logo 212, a channel number 213, a program title 214, start and end times 216 for the program, a brief summary of the program 218 and identifiers 222a–222d of program properties with respective indicators 220a–220d of whether the currently selected program has each of the properties.

In addition to the tuning function described below, the channel function control display 24 may be used to control a number of aspects of the television receiver. It may be used, for example, to lock specific channels (e.g. to prevent underage viewers from being able to access adult programming), to add channels to or remove channels from a favorite channels list.

Channel matrix 20 comprises n columns and m rows for displaying n×m channel numbers via channel indicators 230. In FIG. 2, a 10×10 matrix is shown for illustrative purposes. The channels are divided into groupings based on information contained in the channel matrix group indicator 232. Because the exemplary embodiment of the invention displays up to 100 channels at a time in the matrix 20, the value in group indicator 232 indicates a base channel number corresponding to the 00 entry of the matrix. Thus, the channel matrix shown in FIG. 2 displays the available channels for channel numbers 001 through 099 with an indication of whether each channel is currently carrying a program in the indicated category 210.

As shown in FIG. 2, some of the channel indicators 230 in the channel matrix 20 appear as normal text and some appear as bold text. In addition, some of the channel indicators are underlined and some channel indicators are missing. The combination of the bold-text and normal-text channel indicators represent the channels that can be tuned by the television receiver. Channels for which a channel number is missing can not be received by the television receiver. These channels, for example, may be empty channels or they may be channels having V-Chip ratings that are in excess of a preprogrammed limit. Underlined channels represent multi-program channels. As described above, Each of these channels carries multiple television programs that may be separately received by the television receiver.

A viewer navigates the grid by using four directional arrow keys (not shown) and an ACTION key on the remote control device 124. Pressing the arrow keys moves a focus cursor 240 in the direction of the arrow key. As shown in FIG. 2, the cursor 240 is on channel 1 and the channel status portion 26 of the channel surfing display 24 indicates the parameters of the program currently being broadcast over channel 1. If the viewer presses the right-arrow button on the remote control device 124, the cursor moves from channel 1 to channel 2. If, instead, the viewer presses the down arrow, the cursor moves to channel 11. If the viewer presses the up arrow or the left arrow when the cursor indicates channel 1, the focus cursor 240 highlights the channel group indicator 232. Pressing the right or left arrow key while the group indicator 232 is selected causes the group indicator to be incremented or decremented by n×m. In the example shown in FIG. 2, n×m is 100. Pressing the right or down arrow keys while the channel matrix group indicator 232 is selected returns the focus cursor 240 to the indicator 230 for channel 01 in the channel matrix 20.

Figure 3:
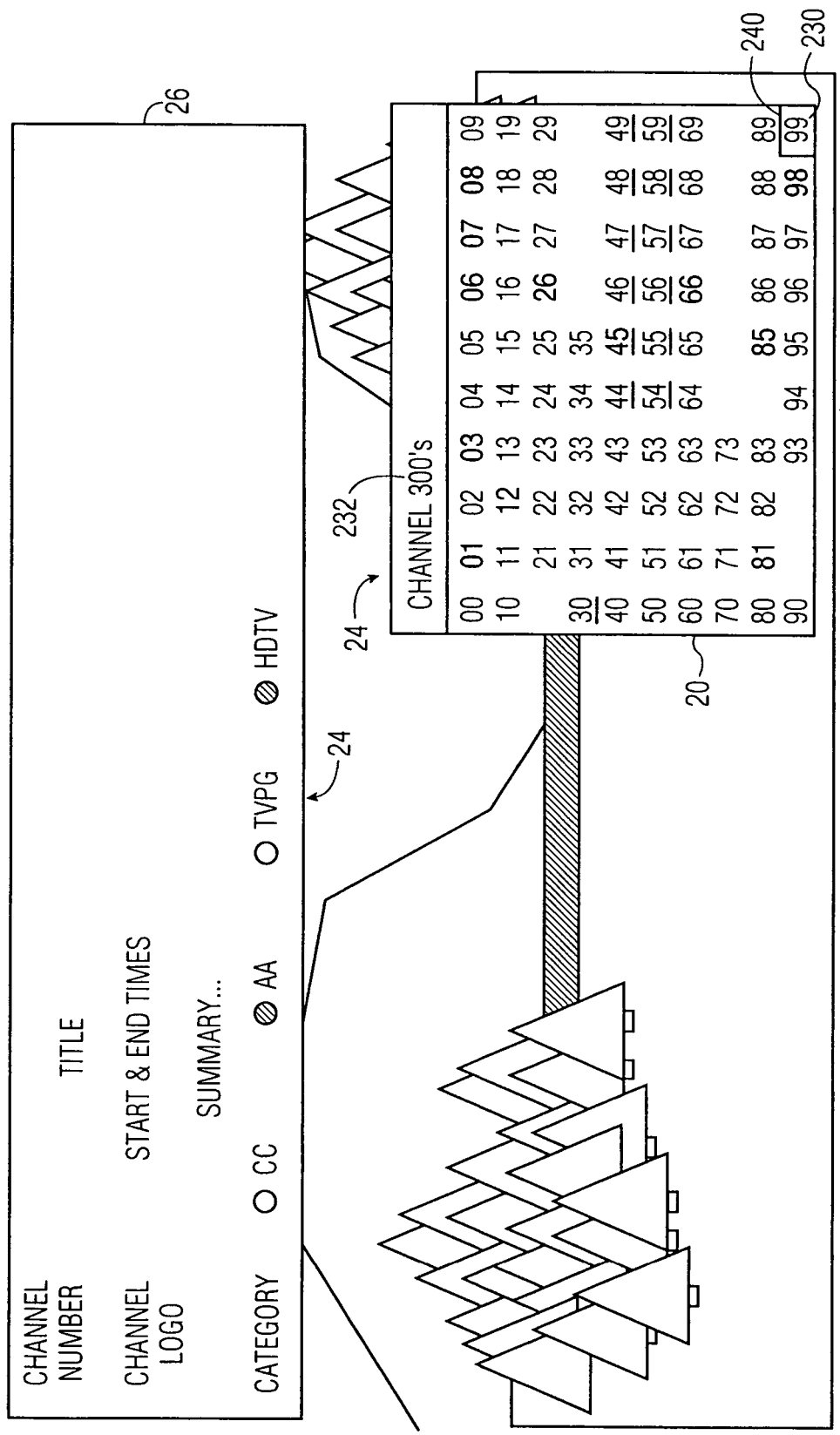
FIGS. 3 and 4 are graphical depictions of exemplary channel matrix displays which are useful for describing the operation of the invention.
Figure 4:
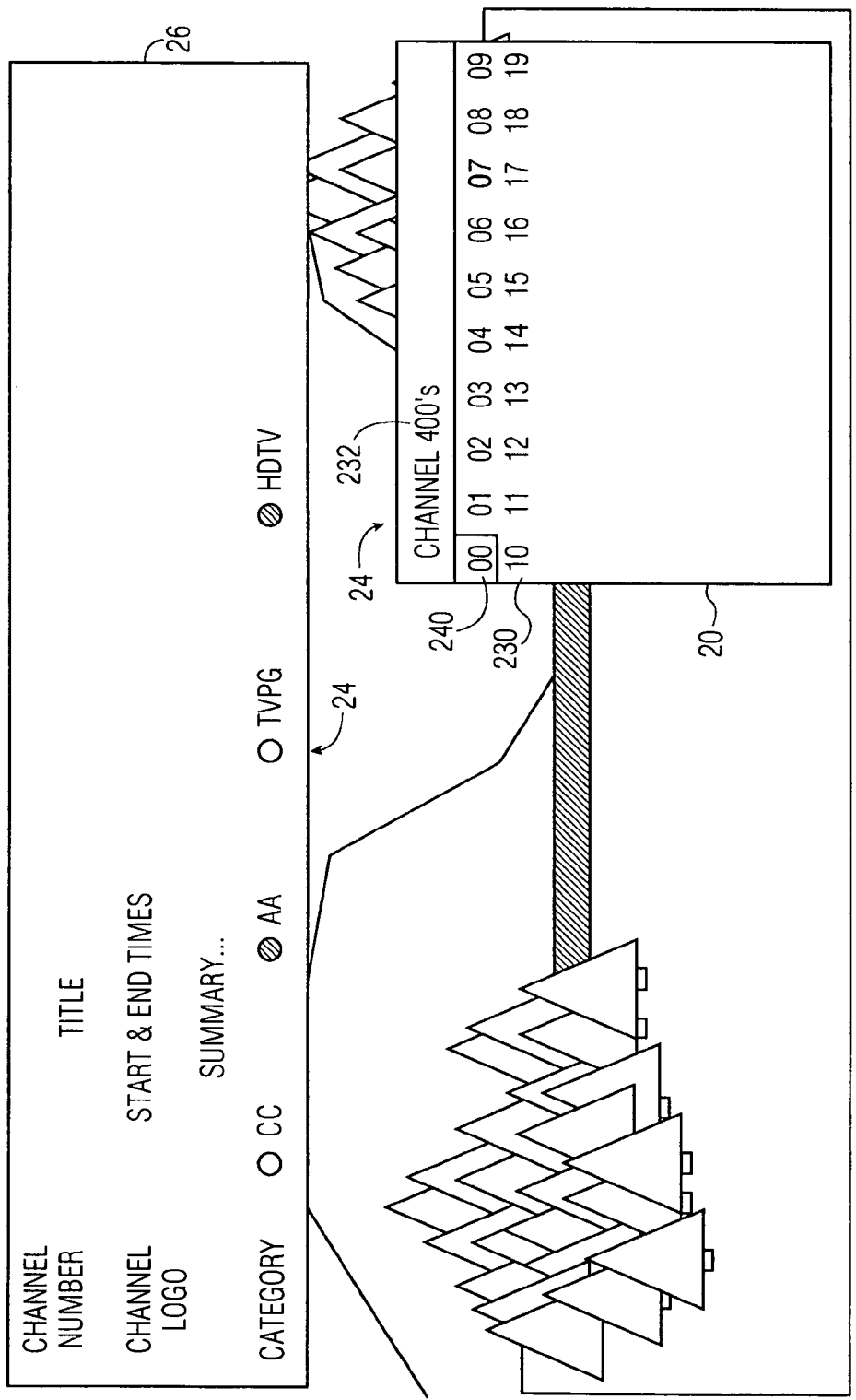

FIGS. 3 and 4 illustrate how the viewer navigates through the channel matrix. FIG. 3 shows the cursor 240 positioned over the channel indicator 230 for channel 99 when the channel group indicator 232 shows the channels in the group beginning at 300. Thus, in FIG. 3, channel 399 is selected. If the viewer then presses the right arrow key, the screen display shown in FIG. 4 is presented. In this display, the channel group indicator shows the base channel as 400 and the cursor 240 is positioned over the channel indicator 230 for channel 00. Thus, channel 400 is selected. Pressing the left arrow key from the display shown in FIG. 4 returns the viewer to the display shown in FIG. 3. Pressing the up arrow key moves the focus cursor 240 to the channel group indicator 232.

Figure 5:
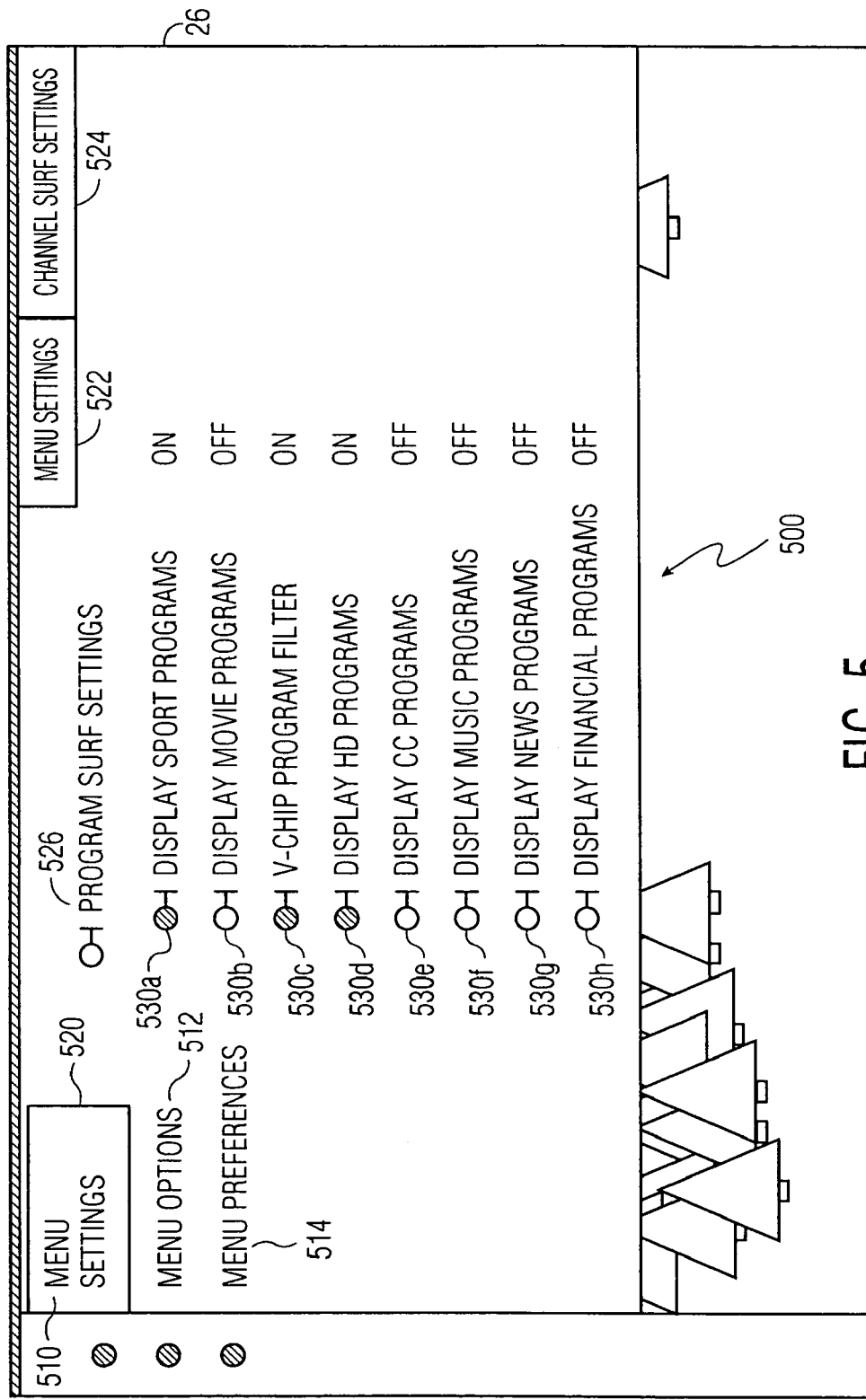
FIGS. 5, 6 and 7 are graphical depictions of exemplary menu screens that are useful for setting up the channel surf grids.
Figure 6:
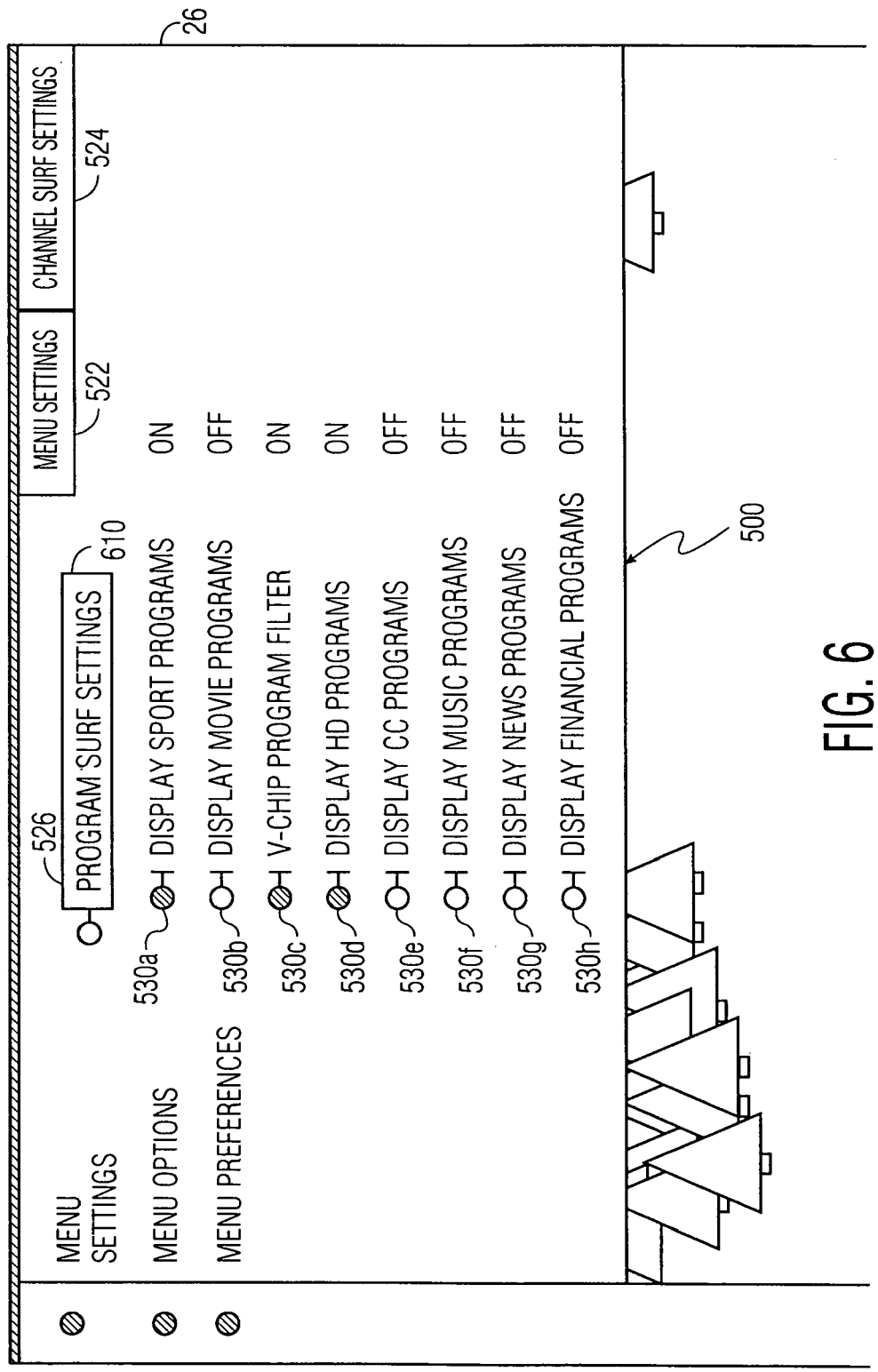
Figure 7:
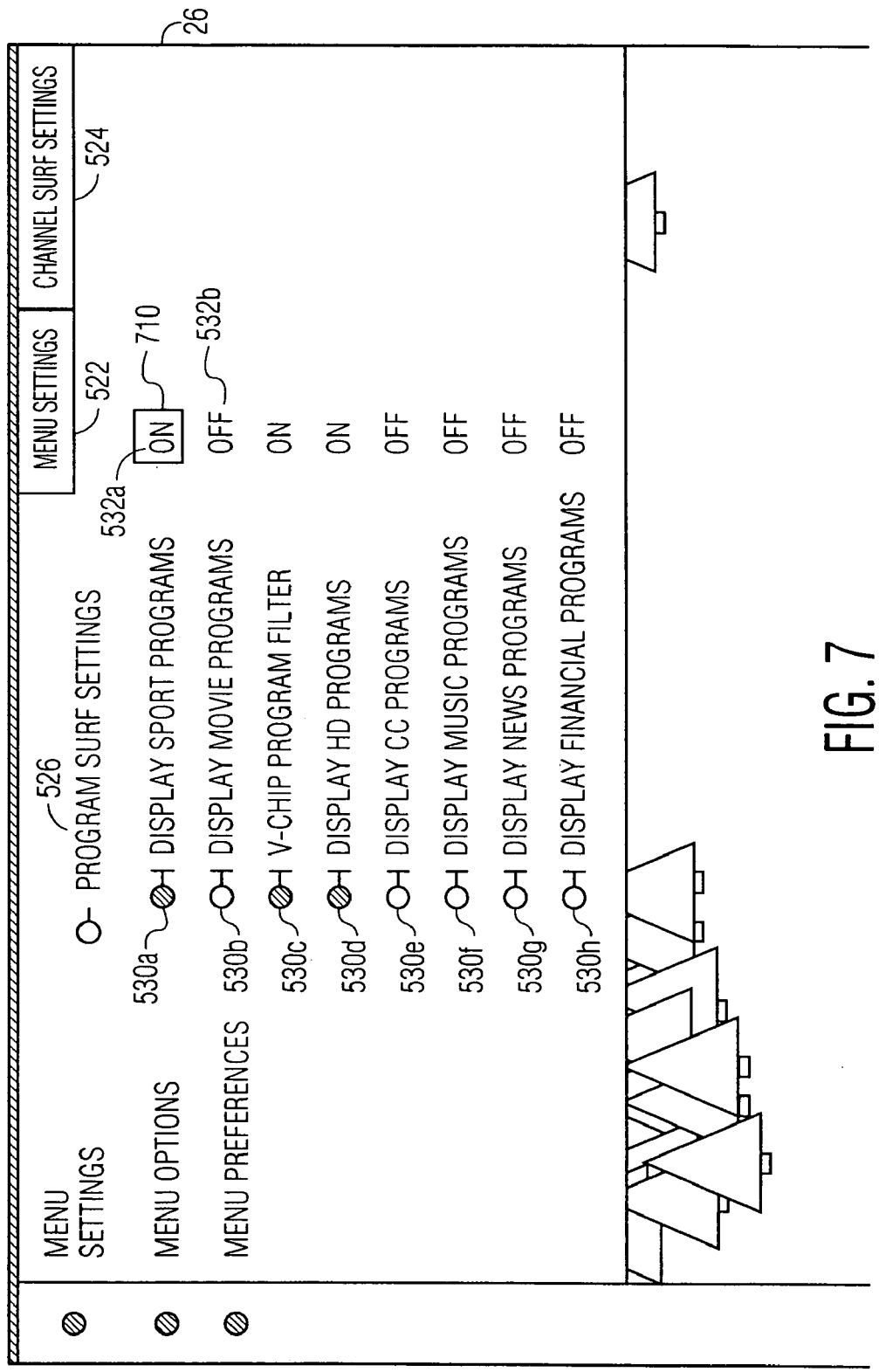

The present invention uses the channel grid to implement a channel surfing function. The surfing function allows the viewer to configure the channel grid so that particular types of programming are highlighted. FIGS. 5, 6 and 7 are menu diagrams that illustrate the configuration of the surfing grid. FIG. 5 shows an exemplary menu selection screen. A viewer would get to this screen through a menu function in the television receiver that is activated by the remote control device 124. The menu screens shown in FIGS. 5, 6 and 7 represent one branch of the menu tree that is relevant to the subject invention. For the sake of brevity, the menu commands leading up to the menus shown in FIGS. 5, 6 and 7 are not shown.

Menu items 510, 512 and 514 on the left side of the display allow the viewer to select whether menu settings, menu options or menu preferences are to be adjusted. The following is a description of the menu settings function followed by a brief description of the menu options and menu preferences functions.

In the exemplary embodiment, the viewer has selected menu settings, as indicated by the focus box 520. When this option is selected, the viewer has two choices: menu settings 522 or channel surf settings 524. As indicated by the focus box around the channel surf settings indicator, in the screen shown in FIG. 5, the viewer is adjusting the channel surf settings.

By moving the down arrow key on the remote control device 124, the viewer then chooses to adjust the program surf settings as shown by the focus box 610 around the program surf settings indicator 526 in FIG. 6. If, from the display shown in FIG. 6, the viewer presses the down arrow key, the display shown in FIG. 7 is produced. In this display, the viewer is able to toggle the value of the "display sports programs" switch 530a, as indicated by the focus box 710 around the switch state indicator 532a. It is noted that, in the exemplary embodiment of the invention, the switch state is indicated both by the words "ON" and "OFF" to the right of the switch indicator and by a respective filled-in or open circle to the right of the switch indicator. If, from the screen display shown in FIG. 7, the viewer presses the ACTION key on the remote control device 124, the state of the "display sports programs" switch 530a will change to "OFF." If the viewer then presses the down arrow, the focus box 710 moves to the state indicator 532b for the "display movie programs" switch.

The channel surf settings are a plurality of on-off switches 530a through 530h. Both the number and type of switches shown are exemplary. It is contemplated that other types of switches may be used and that the display may contain either more or fewer switches. In the exemplary embodiment of the invention, three types of switches are included in the channel surf settings: 1) program type switches 2) program feature switches and 3) access privilege switches. The exemplary program type switches include a sports program switch 530a, a movie program switch 530b, a music program switch 530*f*, a news program switch 530*g* and a financial program switch 530*h*. The program feature switches include a high definition (HD) program switch 530*d* and a close captioned (CC) program switch 530*e*. The one access privilege switch is the V-Chip program filter switch 530*c*.

As shown in FIG. 5, one or more of the switches may be selected to be "ON" at any time. In the exemplary configuration, the viewer has selected the switches 530 to display high-definition television (HDTV) sports programs and to enable the V-Chip program filter. Thus, the program surf grid will highlight all sports programs that are broadcast in HDTV format and will display the V-Chip rating of each selected program. In the exemplary embodiment of the invention, the program type switches combine as an OR function and the program feature switches combine with the program type switches in an AND function. Thus, if switch 530*f* were set to the "ON" state, the program surf grid would highlight both sports and music programs that were in high-definition format. If none of the program type switches are turned "ON," then the program feature switches cause the program surf grid to highlight all programs having those features. Thus, if only the "display HD programs" switch is "ON," then the program surf grid will highlight all programs that are received in HDTV format. Likewise if only the "display CC programs" switch is "ON," the program surf grid will highlight all programs that include closed captions. In the exemplary embodiment of the invention, however, the program feature switches combine with an AND function. Thus, if both switches are "ON" the program surf grid highlights all HDTV programs that include closed captions.

The Menu Options and Menu Preferences menus are not shown. Briefly, the Menu Options menu may be used to define additional program categories. A viewer may, for example, define several sports sub-categories such as golf, tennis, football and baseball. In addition, a viewer may define a category for movies having a particular actor, such as all Daryl Hannah movies. This information is available in Electronic Program Guides such as the Replay TV guide. This menu (not shown) may include, for example, a form including preset fields containing, for example, program types (e.g. sports, movies, news, documentaries) and V-Chip ratings, and fill-in field where the viewer may enter, for example, the name of a favorite actor, athlete or sports team. This form may be a static form that allows a viewer to enter data for any type of program or it may be a dynamic form that changes once a selection has been made. If, for example, the viewer selects sports as a program type, the form may change to have preset fields for particular sports (e.g. golf, tennis, football, hockey) and a fill-in field for a favorite athlete.

The Menu Preferences menu allows a viewer to set default values for the program surf settings. As a default when the television is first turned on, a viewer may want to see only news programs. In the Menu Preferences menu, the viewer would turn "ON" the "display news programs" switch and turn all of the other switches "OFF" as the default state for the switches when power is applied to the television receiver. This menu may also include a switch that causes the receiver to maintain the previous state of the switches upon power up. Additionally, this menu may allow for multiple surf settings (not shown), one for each of a plurality of viewers. In this instance, the program surfing system may be modified to ask for an identifier or password before displaying the program surf grid.

Figure 8:
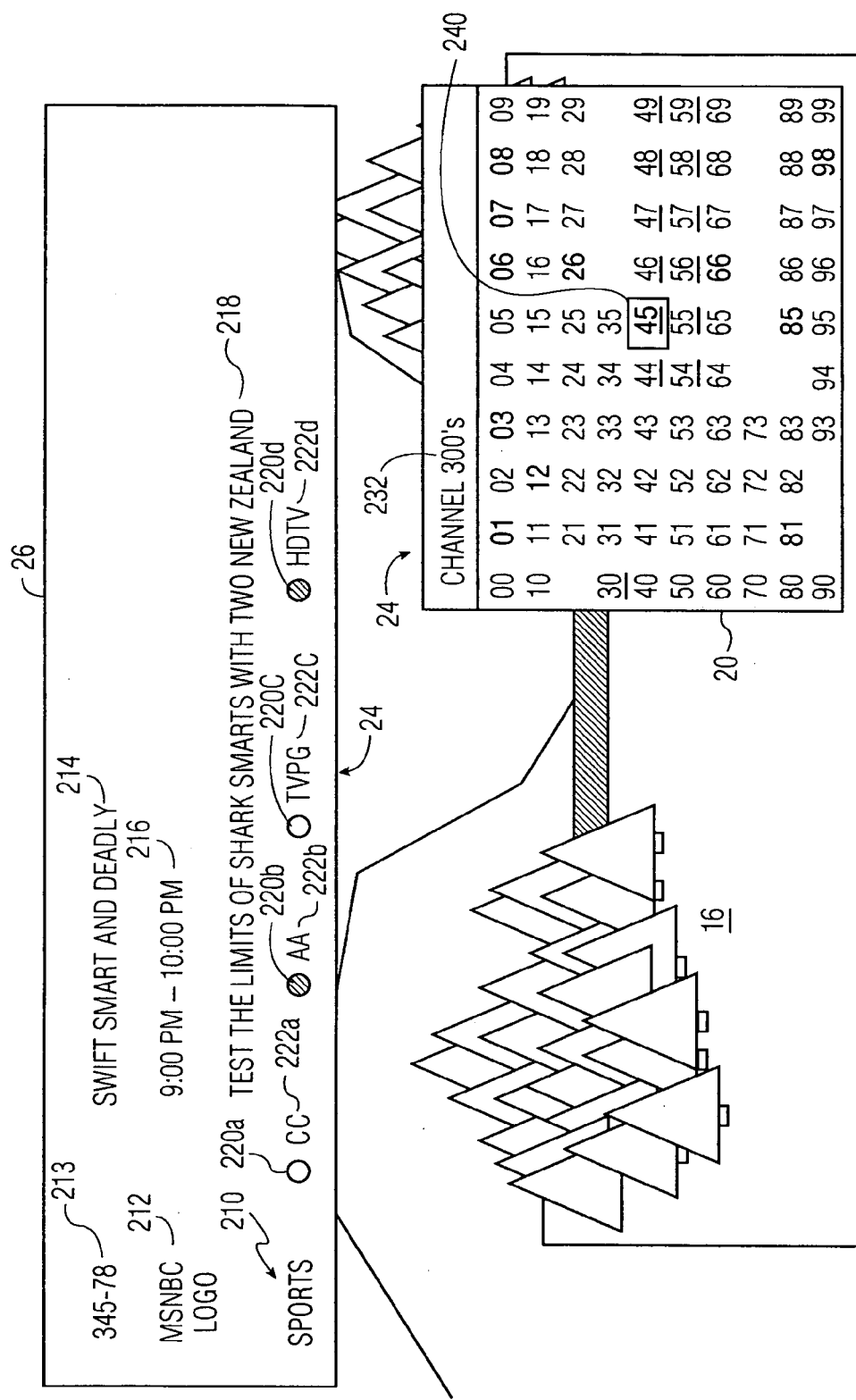
FIGS. 8 and 9 are graphical depictions of exemplary channel matrixes as they may be used to tune the television receiver in program surf mode.
Figure 9:
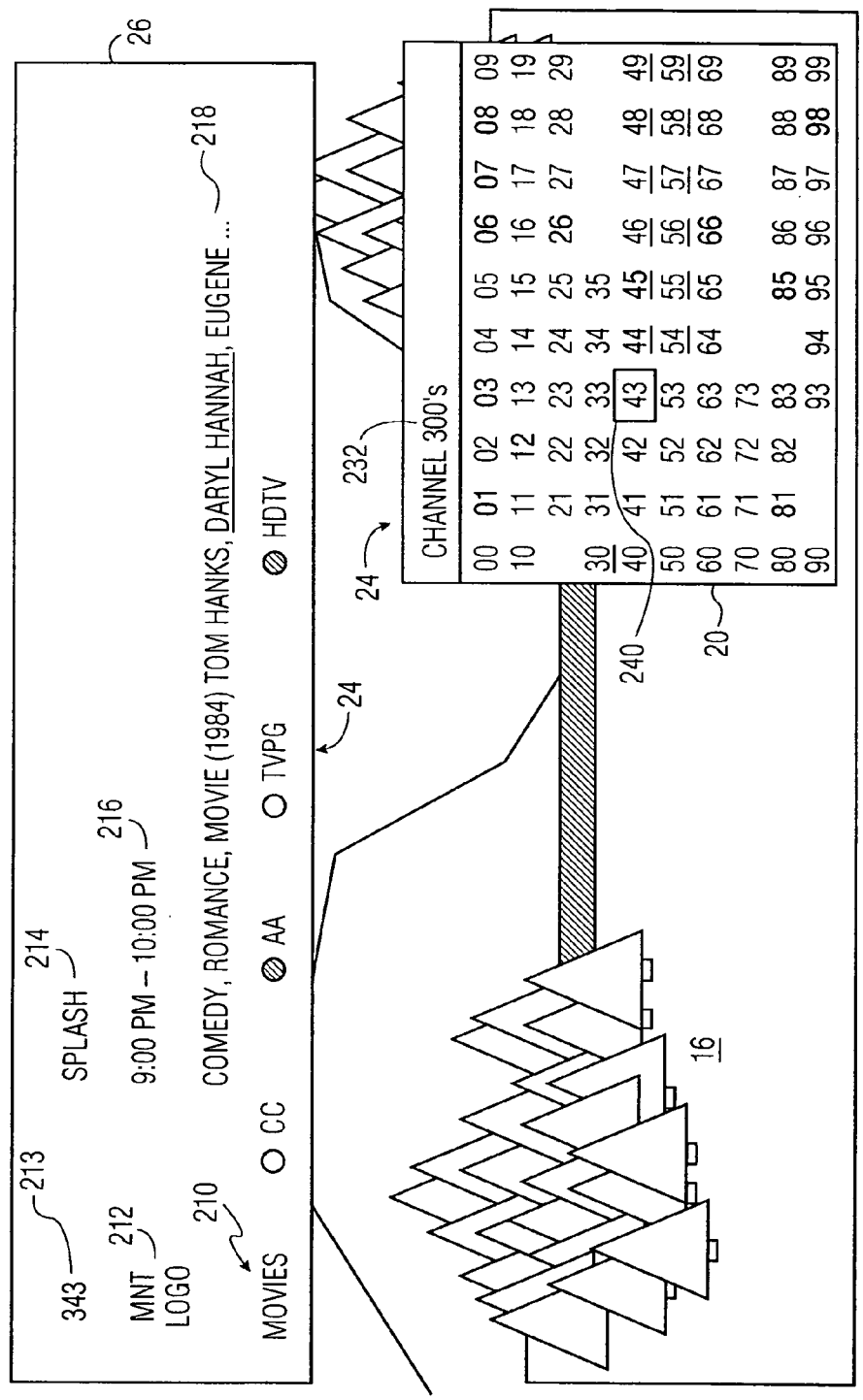

When the viewer has configured the surf function using the menus shown in FIGS. 5, 6 and 7, he or she then presses the menu button on the remote control device 124 and then presses a surf button to enable the program surf function. FIGS. 8 and 9 are screen diagrams that show possible implementations of the channel map 20 as a program surf grid. FIG. 8 shows an example of how a channel map 20 may be used to select from among the available channels in a television system. The display shown in FIG. 8 includes a video image section 16 and a channel information section 30. The displayed channel is minor channel 78 of channel 345 as indicated by the value 345-78 in the channel number field 213 and by the cursor focus box 240 being positioned on channel number 45 in the 300 channel group, as indicated by the channel matrix group indicator 232.

In this example, the cursor is positioned on channel 345 is by the viewer navigating through the channel matrix 20 as described above. As the cursor 23 passes over each channel, the channel information section 26 of the display shows the title 214 of the program, its start and end times 216, a brief summary 218 of the program, an icon or logo 212 appropriate for the channel, an icon or logo 210 appropriate for the viewer selected group of surf channels (in this instance, Sports), and the channel number 213. In addition, the information section may display an indication 220*d* and 222*d* of the program format (e.g. high definition television (HDTV)), an indication 220*b* and 222*b* of the V-Chip rating for the program (e.g. all audiences (AA)), a closed caption symbol 222*a* and indicator 220*a* which, in the example shown in FIG. 8, indicates that closed caption text is not available. The background video image 16 does not change until the viewer selects a channel in the channel matrix, for example, by pressing the ACTION key while the cursor 240 is positioned over the channel number.

The surf status of the channels is indicated by the channels being highlighted (in the exemplary embodiment of the invention, highlighted channels are displayed in bold text). Thus, in the exemplary embodiment of the invention shown in FIG. 8, channels 301, 303, 306–308, 312, 326, 345, 381, 385 and 398 all are HDTV sports programs. A viewer may move from one sports program to the next by navigating the cursor 240 to select only channels that are displayed in bold text.

The surf menu highlights channels having the type or types of programming and other features that were selected by the viewer in the program surf settings menu as described above. If a multi-program channel includes any minor channel that meets the currently selected surf criteria, the channel indicator 230 for that major channel is highlighted in the channel matrix 20. The viewer may, however, still tune to the channels that are not highlighted. This is illustrated by FIG. 9. In this figure, the viewer has moved the cursor 240 to channel 343. The program status area 26 of the channel surfing display 24 now shows program information for the program in channel 343 as shown by the channel number field 213. This program is a movie, as indicated by the channel category identifier 210. The logo indicates the Movie Network (MNT) and the title 214, start and stop times 216 and summary 218 are all changed to data relevant to the selected movie. In particular, it is noted that the name of the actor is underlined in the data related to the movie. This indicates that the viewer has selected a sub-category of Daryl Hannah movies and that, if the viewer changes the program surf settings to include the program type "Daryl Hannah movies," the program surf screen will highlight channel 343.

In the exemplary embodiment of the invention, the channel matrix 20 changes in real time to track changes in the status of the programs being sent through the channels. If for example, the type of programming on a channel changes so that the channel no longer includes programming of the type selected in the program surf settings menu, the highlighting is removed from the channel number in the channel matrix 20. As another example, if a major channel having multiple SDTV programs in respective minor channels changes to have a single HDTV program, the underline beneath the channel would disappear as soon as the change was detected. Alternatively, if the matrix 20 is generated from an electronic program guide (EPG) database, the matrix would change at times indicated in the EPG database for the corresponding change in the television signal to occur.

A viewer defined group of surf channels comprises channels that carry viewer selected programming and may or may not have certain properties. In addition, in the exemplary embodiment of the invention, each category may contain subcategories. For example, the category of sports may contain subcategories for a number of specific sports. Thus, one viewer may select all the golf channels, another viewer may select all the football channels, and a third viewer may select all the golf, football, and baseball channels.

It is envisioned that multiple highlighting techniques may be used to highlight a viewer-defined channel and group indicators (e.g., color-coding, multiple fonts, italics, bold, blinking, and audio cues). It is also envisioned that viewer-defined program categories may be generated automatically from various sources (e.g., electronic program guides (EPG) databases and/or V-chip ratings).

In view of the convergence of television and home computers, it is contemplated that a user interface according to the present invention may be implemented in software to be run on a home computer. This software may be embodied in a computer program on a computer-usable carrier such as a magnetic disk, optical disk, radio frequency carrier wave or audio frequency carrier wave.

Although illustrated and described above with reference to certain specific embodiments, the present invention is nevertheless not intended to be limited to the details shown. Rather, various modifications may be made in the details within the scope and range of equivalents of the claims and without departing from the invention.

What is claimed is:

1. A display interface having a group of channels for tuning a television receiver, said display interface comprising:
   a channel matrix having n columns and m rows for displaying a plurality of channel indicaters for at most n×m channels, the channel matrix including entries for both available and unavailable channels, where n and m are positive integers greater than 2, each channel indicator corresponding to a respectively different position in the matrix, wherein channel indicators corresponding to channels having programs with viewer selected features are highlighted and the channels represented by the channel matrix are one group of channels among a plurality of channel groups;
   a channel group indicator, separate from the plurality of channel indicators, configured to be selected to switch the channel matrix among the groups of channels to select a current group of channels and to display a base channel number for the current group of channels;
   a cursor configured to be moved to positions along the rows and columns of the matrix;
   a channel status section, separate from the channel matrix, which displays status information, including a channel number and a plurality of program property indicators of a television channel corresponding to the indicator at the position of the cursor on the matrix, wherein the channel status section and the channel matrix are displayed concurrently; and
   a channel selector which selects and tunes the channel number equal to a sum of the base channel number and the channel indicator at the position of the cursor on the matrix.

2. A display interface in accordance with claim 1, wherein the viewer selected features include a plurality of program types and the display interface further includes means for selecting one of the program types as the viewer selected feature.

3. A display interface in accordance with claim 2, wherein the program types are predetermined program types.

4. A display interface in accordance with claim 2, wherein the program types are defined by the viewer.

5. A display interface in accordance with claim 1, wherein the viewer selected features include at least one program transmission characteristic.

6. A display interface in accordance with claim 1, wherein n and m equal 10 such that each group of channels includes at most 100 channels.

7. A display interface in accordance with claim 1, wherein each channel indicator in said channel matrix is color-coded to indicate the status information of the corresponding channel.

8. A display interface in accordance with claim 1 further including a remote control device, including at least one cursor navigation key for moving the cursor along the rows and columns of the matrix, wherein the channel selector is a further key on the remote control device.

9. A display interface in accordance with claim 1 further including a voice recognition system that recognizes voiced direction commands to move the cursor along the rows and columns of the matrix and recognizes a voiced selection command to act as the channel selector.

10. A display interface in accordance with claim 1, wherein the channel status section further includes a brief summary of a program on a television channel corresponding to the indicator at the position in the matrix indicated by the cursor.

11. A display interface in accordance with claim 1, wherein the channel status section further includes a channel logo of a television channel corresponding to the indicator at the position in the matrix indicated by the cursor.

12. A user interface method for controlling a television receiver to select television programs that are transmitted through the channels for display, wherein the television receiver is configured to receive C channels, where C is an integer, the method comprising the steps of:
   displaying a channel matrix having n columns and m rows for displaying channel indicators tar at most n×m channels, the channel matrix including entries for both available and unavailable channels, where n and m are positive integers greater than 2 and n×m is less than C, each channel indicator corresponding to a respectively different position in the matrix, wherein channel indicators corresponding to channels having programs with viewer selected features are high ighted and the channels represented by the channel matrix are a current group of channels selected from among a plurality of channel groups;
   displaying a base channel number, separate from the plurality of channel indicator, in the current group of channels as a channel group indicator;

selecting the channel group indicator to switch the channel matrix among the groups of channels and to select the current group of channels;

moving a cursor over the channel indicators in the matrix to indicate a possible selection of a channel corresponding to one of the channel indicators in the current group of channels;

displaying status information, separate from the channel matrix and including a channel number and a plurality of program property indicators concerning the possibly selected channel, wherein the channel status section and the channel matrix are displayed concurrently;

responsive to the displayed status information, selecting the channel in the current channel group corresponding to the channel indicator at the position in the matrix indicated by the cursor; and tuning the television receiver to the channel number equal to the sum of the channel indicator at the position in the matrix indicated by the cursor and the base channel number.

13. A method in accordance with claim 12, further including the steps of:

prompting a viewer to select the features of the programs;

displaying the channel group indicator to represent the one group of channels in which all channel indicators in the one group of channels that have at least one of the selected features are highlighted.

14. A method in accordance with claim 13 wherein the step of highlighting the channel indicators for the programs having the viewer selected features includes the step of displaying the highlighted channel indicators in a different color than other channel indicators in the channel matrix.

15. A method in accordance with claim 14 further including the steps of:

displaying a feature selection portion including a plurality of features representing respectively different types of programs and at least one feature representing a function that may be performed on the channels represented by the channel matrix and prompting a viewer to select at least one program type or at least one function as the selected features; and highlighting the channel indicators in the current group of channels corresponding to channels having the programs with the selected program types and displaying, in the status information, results of applying the at least one selected function to the possibly selected channel.

16. A method in accordance with claim 15 where the at least one function includes determining a V-Chip rating for the possibly selected channel.

17. Apparatus for implementing a display interface having a group of channels for tuning a television receiver, said apparatus comprising:

means for displaying a channel matrix having n columns and m rows for displaying channel indicators for at most n×m channels, the channel matrix including entries for both available and unavailable channels, where n and m are positive integers greater than 2, each channel indicator corresponding to a respectively different position in the matrix wherein channel indicators corresponding to channels having programs with viewer selected features are highlighted and the channels represented by the channel matrix are a current group of channels selected from among a plurality of channel groups;

channel group selection means, separate from the plurality of channel indicators, for switching the channel matrix among the groups of channels to select a current group of channels and for displaying a base channel number in the current group of channels;

means for moving a cursor over the channel indicators in the matrix to indicate a possible selecting of a channel corresponding to one of the channel indicators;

means for displaying status information, separate from the channel matrix, and including a channel number and a plurality of program property indicators concerning the possibly selected channel, wherein the channel status section and the channel matrix are displayed concurrently; and means, responsive to the displayed status information, for indicating a selection of the channel indicator corresponding to the possibly selected channel and for tuning the television receiver to the channel number equal to the sum of the channel indicator at the position in the matrix indicated by the cursor and the base channel number.

18. A computer readable carrier inducing a computer program that controls a computer to implement a display interface having a group of channels for tuning a television receiver, the computer program causing the computer to perform the steps of:

displaying a channel matrix having n columns and m rows for displaying channel indicators for at most n×m channels, the channel matrix including entries for both available and unavailable channels, where n and m are positive integers greater than 2, each channel indicator corresponding to a respectively different position in the matrix, wherein channel indicators corresponding to channels having programs with viewer selected features are highlighted and the channels represented by the channel matrix are a current group of channels selected from among a plurality of channel groups;

displaying a base channel number, separate from the plurality of channel indicators, in the current group of channels as a channel group indicator;

selecting the channel group indicator to switch the channel matrix among the groups of channels and to select the current group of channels;

moving a cursor over the channel indicators in the matrix to indicate a possible selection of a channel corresponding to one of the channel indicators;

displaying status information, separate from the channel matrix and including a channel number and a plurality of program property indicators concerning the possibly selected channel, wherein the channel status section and the channel matrix are displayed concurrently;

responsive to the displayed status information, selecting the channel indicator corresponding to the possibly selected channel; and tuning the television receiver to the channel number equal to the sum of the channel indicator at the position in the matrix indicated by the cursor and the base channel number to cause the television receiver to display the television program corresponding to the selected channel.

* * * * *